United States Patent
Budmiger

(10) Patent No.: US 6,634,238 B2
(45) Date of Patent: Oct. 21, 2003

(54) METHOD OF OPERATING AN ELECTROMAGNETIC FLOWMETER

(75) Inventor: Thomas Budmiger, Ettingen (CH)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 10/157,931

(22) Filed: May 31, 2002

(65) Prior Publication Data
US 2003/0005778 A1 Jan. 9, 2003

Related U.S. Application Data
(60) Provisional application No. 60/311,386, filed on Aug. 13, 2001.

(30) Foreign Application Priority Data
Jul. 9, 2001 (EP) .............................................. 01116550

(51) Int. Cl.⁷ ................................................. G01F 1/60
(52) U.S. Cl. ................................. 73/861.17; 73/861.12
(58) Field of Search ........................ 73/861.12, 861.16, 73/861.17, 861.11

(56) References Cited

U.S. PATENT DOCUMENTS

| | | | |
|---|---|---|---|
| 4,483,201 A | * 11/1984 | Haug | ....................... 73/861.12 |
| 4,644,799 A | * 2/1987 | Tomita | ..................... 73/861.12 |
| 5,325,724 A | 7/1994 | Kiene et al. | |
| 5,351,554 A | * 10/1994 | Budmiger | ................ 73/861.17 |

FOREIGN PATENT DOCUMENTS

EP 0641999 A1 3/1995

* cited by examiner

Primary Examiner—Harshad Patel
(74) Attorney, Agent, or Firm—Jones, Tullar & Cooper, P.C.

(57) ABSTRACT

The flowmeter comprises a flow sensor with a flow tube, two electrodes, and two field coils traversed by a first excitation current and a second excitation current, respectively, as well as control and evaluation electronics. The method serves to generate an error signal when the uniform turbulence in the liquid to be measured is disturbed. There are four quarter cycles. During each quarter cycle, a voltage is derived from the electrodes, and from these voltages, a first and a second voltage difference and a quotient using the first and the second voltage differences are formed. The latter is determined during calibration under uniformly turbulent flow conditions, and stored. In operation, values of the quotient are continuously formed and compared with the stored quotient; in case of deviations, an alarm is triggered and/or the volumetric flow rate signal represented by the first voltage difference is corrected.

19 Claims, 2 Drawing Sheets

METHOD OF OPERATING AN ELECTROMAGNETIC FLOWMETER

This application is a provisional application Ser. No. 60/311,386 filed on Aug. 31, 2001.

FIELD OF THE INVENTION

This invention relates to electromagnetic flowmeters comprising a flow sensor, control electronics, and evaluation electronics. In the following, only flowmeters or flow sensors will be spoken of if necessary for simplicity, and to a method of operating the electromagnetic flowmeter.

BACKGROUND OF THE INVENTION

As is well known, electromagnetic flowmeters measure the volumetric flow rate of an electrically conductive liquid flowing through a pipe; thus, per definitionem, the liquid volume flowing through a pipe cross section per unit time is measured.

The flowmeter has a, usually nonferromagnetic, flow tube which is connected into the pipe in a liquid-tight manner, e.g., by means of flanges or threaded joints. The portion of the flow tube which contacts the liquid is generally electrically nonconductive, so that a voltage induced in the liquid according to Faraday's law of electromagnetic induction by a magnetic field cutting across the flow tube will not be short-circuited.

Therefore, metal flow tubes are commonly provided with a nonconductive lining, e.g., a lining of hard rubber, polyfluoroethylene, etc., and are generally nonferromagnetic; in the case of flow tubes made completely of plastic or ceramic, particularly of alumina ceramic, the nonconductive lining is not necessary.

The magnetic field is produced by means of a coil assembly comprising at least two field coils, each of which is positioned on the flow tube along a diameter of the latter. The field coils may be air-core coils or coils with a core of soft magnetic material.

To ensure that the magnetic field produced by the field coils is as homogeneous as possible, the coils are, in the most frequent and simplest case, identical and electrically connected in series, so that in operation they can be traversed by the same excitation current. It is also known to cause the same excitation current to flow through the field coils alternately in the same and the opposite direction in order to be able to determine a flow profile and/or a liquid level in the pipe, see U.S. Pat. No. 5,493,914, or in order to be able to measure the viscosity of non-Newtonian fluids, see U.S. Pat. No. 5,646,353.

The excitation current just mentioned is produced by control electronics; it is regulated at a constant value of, e.g., 85 mA, and its direction is periodically reversed; this serves in particular to largely compensate electrochemical interference voltages developed at the electrodes. The current reversal is achieved by incorporating the field coils in a so-called T network or a so-called H network; for the current regulation and current reversal, see U.S. Pat. No. 4,410,926 or U.S. Pat. No. 6,031,740.

The aforementioned induced voltage is picked off by means of at least two galvanic, i.e., liquid-wetted, electrodes, or by means of at least two capacitive electrodes, i.e., two electrodes disposed in the wall of the flow tube, for example, which in the most frequent case are arranged at diametrically opposed positions such that their common diameter is perpendicular to the direction of the magnetic field and, thus, perpendicular to the diameter on which the field coils are located. The induced voltage is conditioned by means of evaluation electronics to obtain a volumetric flow rate signal, which is recorded, displayed, or further processed.

Electromagnetic flowmeters measure volumetric flow rate with optimum accuracy if the flow in the flow tube is uniformly turbulent. Under this condition of uniform turbulence, each flowmeter is calibrated by the manufacturer, and the values of the so-called calibration factor and the zero drift, which are determined during this calibration, are electronically stored in the flowmeter.

To ensure that after its sale, the flowmeter can be operated with this accuracy in the field, the manufacturer generally specifies an undisturbed inlet section, which is a straight tube length and must be present or be inserted between the flowmeter and a spot of the pipe which disturbs or may disturb the uniform turbulence. Such pipe spots are, for instance, elbows, valves, etc.

During operation of the flowmeter, however, the uniformly turbulent flow profile thus generated may become nonuniform despite the inlet section as a result of unforeseeable events or changes in the liquid. This makes the measurement results inherently more inaccurate and in the worst case even may invalidate the measurement result without this being noticeable.

It is therefore desirable to detect such accuracy-reducing events during measurements, i.e., to derive a corresponding error signal, which then is displayed, triggers an alarm, or serves to correct the measurement result, etc.

To determine the flow profile, but particularly to compensate disturbances in the flow profile, U.S. Pat. No. 5,325,724 proposes to cause excitation currents to flow through both field coils, which produce equidirectional, but temporarily differently strong partial magnetic fields. Investigations have shown, however, that these solutions proposed in U.S. Pat. No. 5,325,724 do not produce the desired effect, namely a significantly asymmetric magnetic field, particularly in the area of the measuring electrodes.

SUMMARY OF THE INVENTION

It is therefore an object of the invention to provide a method and a flowmeter for carrying out this method whereby in operation a significantly asymmetric magnetic field can be produced, so that the flow profile can be monitored with high reliability.

To attain this object, the invention provides a method of operating an electromagnetic flowmeter having a flow tube connected into a fluid-conveying line, said method comprising the steps of:

causing the fluid to flow through the flow tube;

causing a first excitation current of predeterminable strength, generated by means of a measuring and control circuit of the flowmeter, to flow through a first field coil mounted on the flow tube for producing a first partial magnetic field of predeterminable average strength which cuts through the fluid;

causing a second excitation current of predeterminable strength, generated by means of the measuring and control circuit, to flow through a second field coil mounted on the flow tube for producing a second partial magnetic field of predeterminable average strength which also cuts through the fluid;

varying the strength of at least one of the excitation currents in such a manner that the average strengths of the partial magnetic fields are at least temporarily different from each other;

reversing the polarity of one of the two excitation currents in such a manner that the two partial magnetic fields are at least temporarily directed opposite to each other while having different average strengths;

inducing a voltage in the moving fluid traversed by the partial magnetic fields for changing potentials applied to measuring electrodes positioned at the flow tube; and picking off potentials applied to the measuring electrodes for producing a measurement signal derived from the voltage induced in the moving fluid.

Furthermore, the invention provides a method of operating an electromagnetic flowmeter for measuring the volumetric flow rate of an electrically conductive and moving fluid, said flowmeter having a flow sensor comprising:

a flow tube for the moving fluid, of which an inner portion, which contacts the fluid, is electrically nonconductive, and which has a tube wall;

a first electrode positioned at or in the flow tube and a second electrode positioned at or in the flow tube, which electrodes are located on a first diameter of the flow tube;

a coil assembly, mounted on the flow tube and comprising a first field coil and a second field coil, said coil assembly being located on a second diameter of the flow tube, which is perpendicular to the first diameter, and being operable to produce a magnetic field cutting across the tube wall and the fluid when a first excitation current flows in the first field coil and a second excitation current flows in the second field coil, said excitation currents changing their amplitude and direction periodically during each cycle of the excitation currents such that during a first quarter cycle, the excitation currents are equal,
have a constant value, and
flow through the field coils in the same direction, a first direction, during a second quarter cycle,
the first excitation current has the constant value and flows through the first field coil in an opposite direction to the first direction,
the second excitation current is less than the constant value by a constant amount and
flows through the second coil in the first direction, during a third quarter cycle, the excitation currents have the constant value and
flow through the field coils in the opposite direction, and during a fourth quarter cycle,
the first excitation current has the constant value and flows through the first field coil in the first direction, and
the second excitation current is less than the constant value by the constant amount and
flows through the second field coil in the opposite direction, wherein
first, second, third and fourth voltages are formed from the two potentials during the first, second, and fourth quarter cycles, respectively,
a first voltage difference is formed from the first and third voltages, which serves to compute a volumetric flow rate signal,
a second voltage difference is formed from the second and fourth voltages, a quotient is formed from the second and first voltage differences,
the quotient is determined during a calibration step of the electromagnetic flowmeter under uniformly turbulent flow conditions and stored as a device constant in the flowmeter,
instantaneous values of the quotient are continuously formed in operation, which are compared with the device constant, and
when a predeterminable threshold is exceeded, an alarm is triggered and/or the volumetric flow rate signal is corrected.

Moreover, the invention provides an electromagnetic flowmeter for a fluid flowing in a line, comprising:

a flow tube connectable into the line conducting the fluid;

a measuring and control circuit;

a coil assembly fed by the measuring and control circuit, said coil assembly producing a magnetic field cutting across the flow tube by means of a first field coil mounted on the flow tube and by means of a second field coil mounted on the flow tube;

at least two measuring electrodes for picking off potentials which are induced in the fluid flowing through the flow tube and traversed by the magnetic field; and means connected at least intermittently to the measuring electrodes for producing at least one measurement signal derived from the potentials induced in the fluid, with the first field coil being traversed at least intermittently by a first excitation current, and the second field coil being traversed at least intermittently by a second excitation current, the two excitation currents being adjusted by means of the measuring and control circuit in such a manner that at least intermittently, a first partial magnetic field, produced by means of the first field coil, has an average strength which is different from an average strength of a second partial magnetic field, produced simultaneously by means of the second field coil.

In a first preferred embodiment of the method of the invention, the strength of at least one of the excitation currents is varied in such a way that the average strengths of the partial magnetic fields are temporarily essentially equal.

In a second preferred embodiment of the method of the invention, the measurement signal is repeatedly sampled to obtain a sequence of discrete sample values which corresponds to a waveform of the induced voltage.

In a third preferred embodiment of the method of the invention, the sampling sequence is stored section by section in a storage means of the measuring and control circuit.

In a fourth preferred embodiment of the method of the invention, a first voltage difference is determined between sample values of the sampling sequence which were each sampled at an instant when the average strengths of the partial magnetic fields are equal.

In a fifth preferred embodiment of the method of the invention, a second voltage difference is determined between sample values of the sampling sequence which were each sampled at an instant when the average strengths of the partial magnetic fields are different from each other and the partial magnetic fields are directed opposite to each other.

In a sixth preferred embodiment of the method of the invention, a volumetric flow rate value is determined by means of the two voltage differences.

In a seventh preferred embodiment of the method of the invention, the volumetric flow rate value is derived from the first voltage difference, and the second voltage difference is used to correct flow-profile-induced deviations of the first voltage difference from the actual volumetric flow rate.

In an eighth preferred embodiment of the method of the invention, the second voltage difference is used to trigger an alarm which signals a flow profile resulting in erroneous measurement signals.

In a ninth preferred embodiment of the method of the invention, a quotient of the two voltage differences is formed for determining the volumetric flow rate and/or triggering the alarm.

In a tenth preferred embodiment of the method of the invention, the quotient is compared with a threshold value which represents a predetermined flow profile to be monitored.

A fundamental idea of the invention is to produce in operation, particularly in the area of the measuring electrodes, two temporarily oppositely directed partial magnetic fields of different strengths to obtain at least intermittently a magnetic field which is measurably asymmetric with respect to the longitudinal axis of the flow tube, whereby even slight deviations from the flow profile to which the flowmeter was calibrated, and/or changes in the coil assembly or in the electrodes can be detected. Thus, based on the detection of such deviations from the calibrated standard, the measurement results can be corrected in operation or at least an alarm signaling such deviations can be triggered.

The invention is also predicated on the surprising recognition that in the tube cross section, the partial magnetic fields superposition with direction-dependent weighting, giving the magnetic field.

It is an advantage of the invention that unforeseeable flow-profile instabilities and changes occurring, particularly spontaneously, during measurements can be continuously and reliably detected, indicated, and/or corrected. Particularly with regard to the flowmeters disclosed in the above-mentioned U.S. Pat. No. 5,646,353, in which the induced voltage is taken off not along a diameter, but along a chord lying in the cross section of the flow tube, another advantage of the invention is that virtually without any major changes in the mechanical construction of conventional flowmeters, besides the instantaneous flow profile and/or its change, viscosities of non-Newtonian fluids can be determined.

BRIEF DESCRIPTION OF THE DRAWINGS

The method of the invention and further advantages will now be explained in greater detail with reference to the accompanying drawings, in which.

DETAILED DESCRIPTION OF EXEMPLARY EMBODIMENTS

Figure 1:
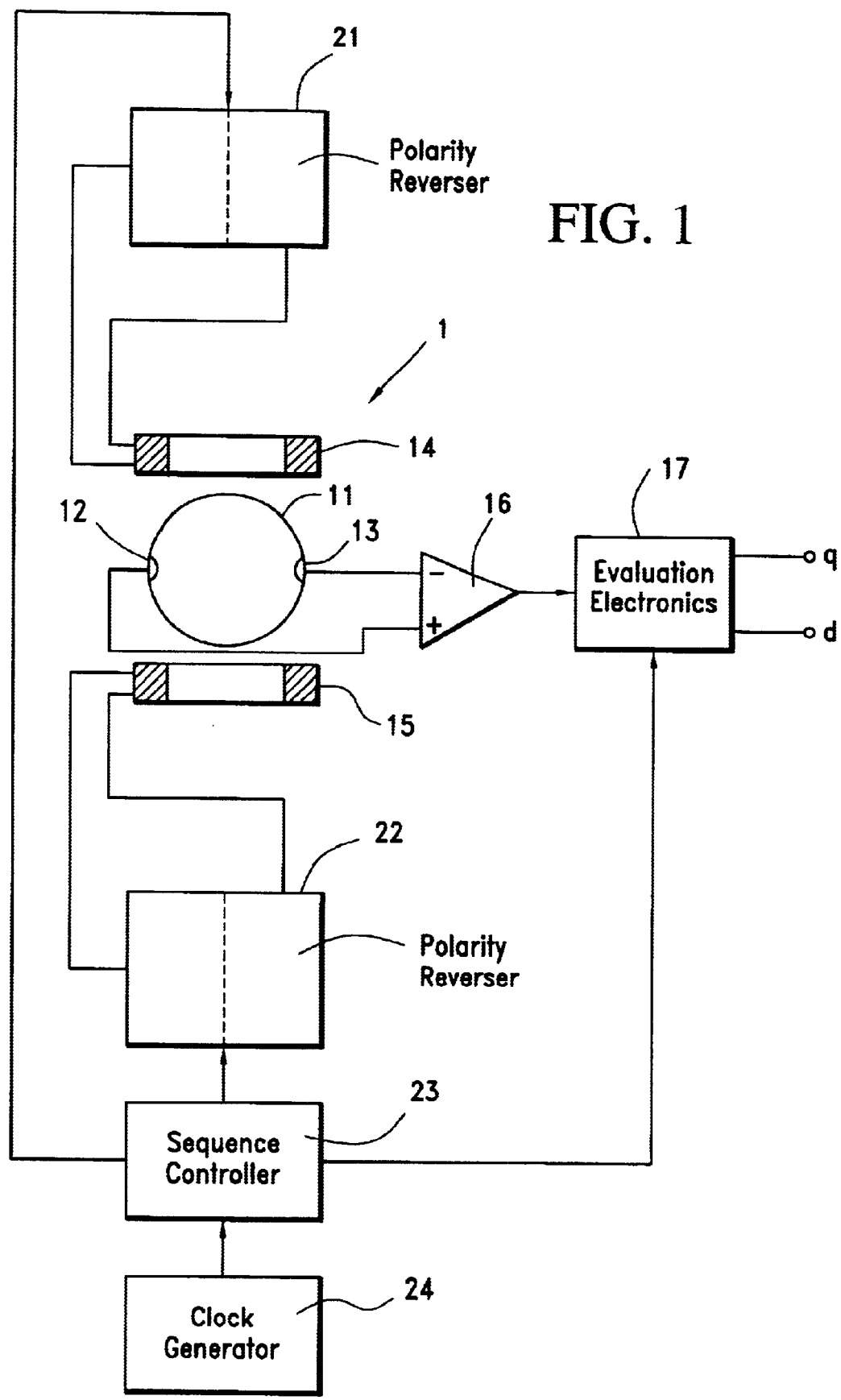
FIG. 1 shows schematically, and partly in block-diagram form, an electromagnetic flowmeter suitable for carrying out the method of the invention.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

Figure 2:
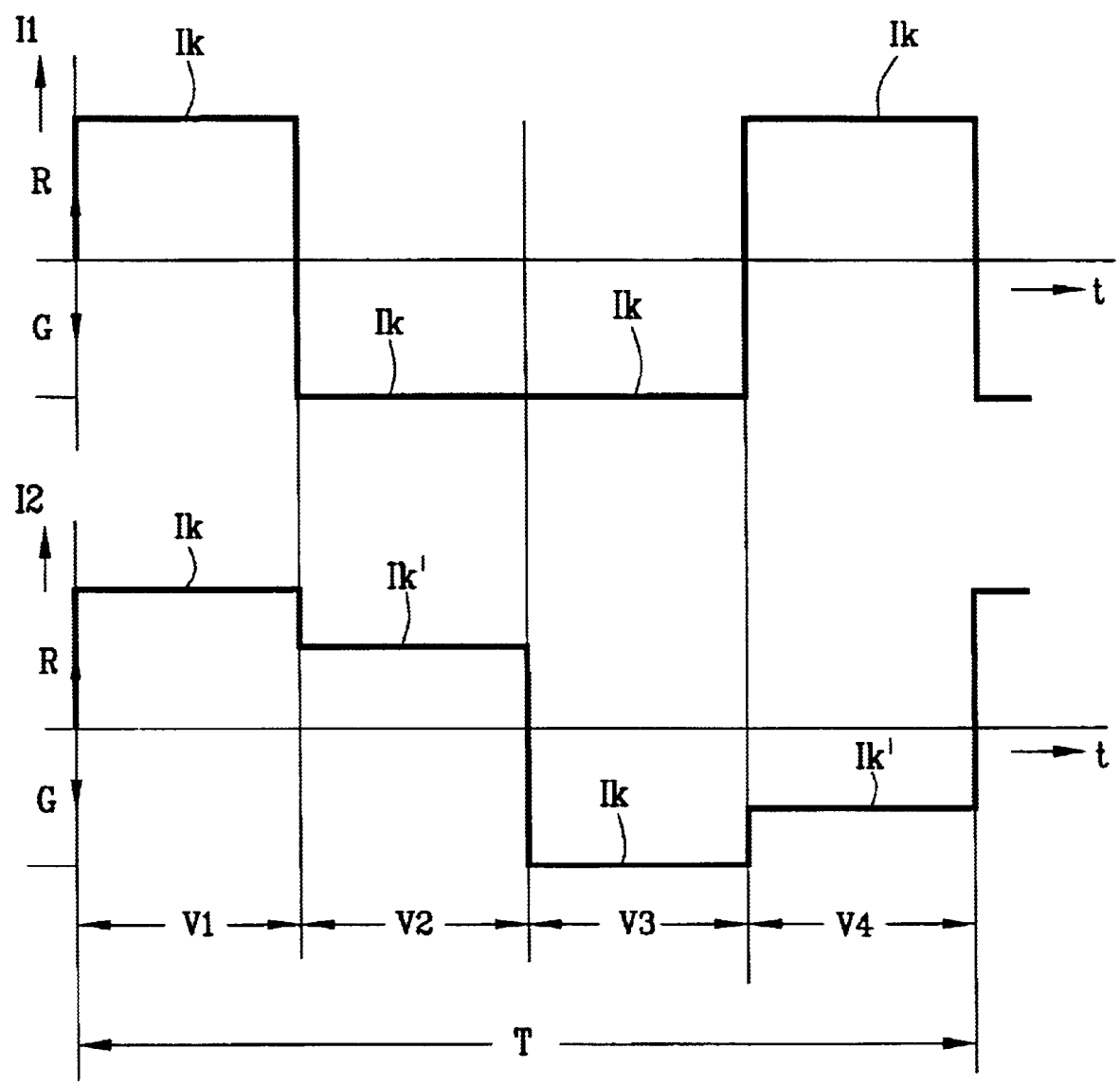
FIG. 2 is a timing diagram of the periodic excitation currents flowing in the field coils.

FIG. 1 shows schematically and partly in block-diagram form an electromagnetic flowmeter for measuring the volumetric flow rate of an electrically conductive and flowing liquid which is suitable for carrying out the method of the invention, and FIG. 2 is a timing diagram showing quantities that occur in operation. FIGS. 1 and 2 will be explained not one after the other, but together.

The flowmeter, with which the method of the invention can be carried out, comprises a flow sensor 1 and a measuring and control circuit. Flow sensor 1 includes a flow tube 11, which has a tube wall and through which in operation the conductive liquid to be measured flows in the direction of a longitudinal tube axis. An inner portion of flow tube 11, which contacts the liquid, is electrically nonconductive, so that no short circuit will be created for the voltage induced by the above-mentioned magnetic field.

Therefore, metal flow tubes are commonly provided with an electrically nonconductive lining, e.g., a lining of hard rubber, polyfluoroethylene, etc, and are generally nonferromagnetic; in the case of flow tubes made completely of plastic or ceramic, particularly of alumina ceramic, the electrically nonconductive lining is not necessary.

An electrode 12 disposed on the inside of the wall of flow tube 11 serves to pick off a first potential induced by a magnetic field. A second electrode 13, also disposed on the inside of the tube wall, serves to pick off a second potential induced by the magnetic field (for the production of the magnetic field, see below). Electrodes 12, 13 are located on a first diameter of flow tube 11.

In FIG. 1, electrodes 12, 13 are galvanic electrodes, which thus contact the liquid. It is also possible to use two capacitive electrodes, i.e., electrodes positioned within the wall of flow tube 11, for example. Each electrode picks off a separate electric potential which in operation is induced in the liquid according to Faraday's law.

A coil assembly has a first field coil 14 and a second field coil 15, which are mounted on flow tube 11. The field coils are located on a second diameter of flow tube 11, which is perpendicular to the first diameter.

In operation, the coil assembly serves to produce a magnetic field cutting across the tube wall and the liquid. The magnetic field is set up when a first excitation current 11 is caused to flow through field coil 14, thus producing a first partial magnetic field of predeterminable average strength, and/or when a second excitation current 12 is caused to flow through coil 15, thus producing a second partial magnetic field of predeterminable average strength.

FIG. 1 shows that the field coils 14, 15 are so-called air-core coils, i.e., that they are coreless. Field coils 14, 15, as is usual with such coil assemblies, may also be wound on a core which will generally be soft magnetic, and the cores may cooperate with pole pieces; see, for instance, U.S. Pat. No. 5,540,103.

The coil assembly is preferably so designed, and in particular the two field coils 14, 15 are so shaped and dimensioned, that within flow tube 11, the magnetic field produced with the coil assembly is symmetric, particularly rotationally symmetric, with respect to the second diameter.

In the invention, the excitation currents I1, I2 are variable bipolar currents, preferably alternating currents.

According to the invention, in operation, at least one of the two excitation currents I1, I2 is varied in strength, i.e., in magnitude, particularly in amplitude, such that the average strengths of the partial magnetic fields are at least intermittently different from each other.

This variation of the strength of at least one of the excitation currents I1, I2 serves to intermittently distort the magnetic field in such a manner that it is asymmetric with respect to the longitudinal axis of the flow tube and/or with respect to the first diameter.

Possible waveforms of the excitation currents I1, I2 in which the respective current strengths and current directions change periodically during a cycle T are shown schematically in FIG. 2.

During a first quarter cycle V1, the excitation currents I1, I2 are equal and have a constant value Ik. They flow through field coils 14, 15, which are assumed here to be wound in the same sense, in the same direction, a first direction R, thus producing a magnetic field which, viewed in the cross section of the flow tube, is essentially symmetric with respect to both the second diameter and the first diameter, particularly as homogeneous as possible.

During a second quarter cycle V2, the excitation current I1 has the constant value Ik and flows through field coil 14 in an opposite direction G to the first direction. The excitation current I2 is less than the constant value Ik by a constant amount, so that it has the value Ik', and it flows through field coil 15 in the direction R. As a result, the two partial magnetic fields are now differently inhomogeneous, which results in a distortion of the magnetic field, so that the latter is asymmetric with respect to the first diameter and, consequently, no longer homogeneous. In this case, the partial magnetic fields also have different strengths.

During a third quarter cycle V3, the excitation currents I1, I2 are equal again and have the constant value Ik. They flow through field coils 12, 13 in the same direction, the opposite direction G, thus producing a homogeneous magnetic field which is now reversed from the direction during quarter cycle V1.

During a fourth quarter cycle V4, the excitation current I1 has the constant value Ik and flows through field coil 14 in the direction R. The excitation current I2 is again less than the constant value Ik by the constant amount, so that it has the value Ik', and it flows through field coil 15 in the opposite direction G. The magnetic field is distorted again, but in the opposite direction to the direction of the distortion during quarter cycle V2.

As the current direction R is represented in FIG. 2 by a positive ordinate and the opposite direction G by a negative ordinate, the constant value Ik and the current value Ik' appear partly positive and partly negative. Since, however, these currents flow through field coils that are not electrically connected with one another, they do not add up, but the same and the opposite direction of the excitation currents affects only the three-dimensional shape of the magnetic field. During quarter cycles V2, V4, this effect is practically the same as if the two field coils were connected in series.

To generate the excitation current I1, FIG. 1 includes a first excitation-current generator and polarity reverser 21, which regulates the current at the constant values Ik, Ik' and effects the reversals according to FIG. 2. The excitation current I2 is generated by a second excitation-current generator and polarity reverser 22, which also regulates the current at the constant values Ik, Ik' and effects the reversals according to FIG. 2; for the current regulation and polarity reversal, see, for example, U.S. Pat. No. 4,410,926 or U.S. Pat. No. 6,031,740. The polarity reversals are caused by a sequence controller 23 which is controlled by a clock generator 24 and also cooperates with evaluation electronics 17.

In FIG. 1, electrodes 12, 13 are respectively connected in the usual manner to a noninverting and an inverting input of a differential amplifier 16, which forms from the potentials at the electrodes an output voltage serving as a measurement signal. Since the gain of such differential amplifiers generally differs only little from unity, for explanatory purposes, the voltage at the output of differential amplifier 16 can be equated with the voltage at its inputs.

For the further explanation-of the invention it is important that a different measurement signal is formed during each of the four quarter cycles V1, V2, V3, V4, the measurement signals being derived from first, second, third, and fourth voltages U1, U2, U3, and U4 during the first, second, third, and fourth quarter cycles, respectively. To further process the measurement signal, the latter is repeatedly sampled in the usual manner, particularly at a single sampling frequency, namely at least once during the respective quarter cycle. A sequence of discrete sample values generated by the repeated sampling of the measurement signal thus corresponds very precisely to the waveform of the voltage induced in the fluid.

In a preferred embodiment of the invention, the sampling sequence thus generated is digitized and then stored in a storage means of the measuring and control circuit, particularly in a volatile data memory, for further processing in the measuring and control circuit.

In the further course of the measurement, a first sample value U1' of the preferably digitally stored sampling sequence, which value is representative of the voltage U1, is subtracted from a second sample value U3' of this sampling sequence, representing the voltage U3, to obtain a first voltage difference $\Delta U31'=U3'-U1'$, which serves to compute a volumetric flow rate signal q in the usual manner by means of evaluation electronics 17. In other words, the voltage difference $\Delta U31'$ is determined between those values of the sampling sequence which were each sampled at an instant when the average strengths of the partial magnetic fields are equal.

Furthermore, according to the invention, a third sample value U2', representing the voltage U2, is subtracted from a fourth sample value U4', representing the voltage U4, to obtain a second voltage difference $\Delta U42'=U4'-U2'$. This voltage difference $\Delta U42'$ serves as a measure of an instantaneous deviation of the flow profile from the expected flow profile, particularly from the calibrated profile. By forming a quotient $Q=U42'/U31'$, for example, the voltage difference $\Delta U42'$ can advantageously be normalized to the flow rate being measured, thus making flow profiles occurring at different flow rates comparable with one another.

In a further preferred embodiment of the invention, during operation of the flowmeter, instantaneous values of the quotient Q are repeatedly formed, which are compared with a device constant. When a predeterminable threshold is exceeded, this is indicated by a signal d and/or an alarm is triggered and/or the volumetric flow rate signal is corrected. The device constant may be, for instance, a quotient Q which is determined during a calibration of the electromagnetic flowmeter under uniformly or steadily turbulent flow conditions.

It is within the scope of the invention to implement the aforementioned subtractions and divisions at least in part with a suitably programmed microprocessor, which then forms part of evaluation electronics 17 and is preceded by an analog-to-digital converter; see, for example, U.S. Pat. No. 5,907,103. Furthermore, the average strengths of the partial magnetic fields may also be set to more than two different levels.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method of operating an electromagnetic flowmeter having a flow tube connected into a fluid-conveying line, said method comprising the steps of:

causing the fluid to flow though the flow tube;

causing a first excitation current of predeterminable strength, said first excitation current being generated by means of a measuring and control circuit of the electromagnetic flowmeter, to flow through a first field coil mounted on the flow tube for producing a first partial magnetic field of predeterminable average strength which cuts through the fluid;

causing a second excitation current of predeterminable strength, said second excitation current being generated by means of said measuring and control circuit, to flow through a second field coil mounted on the flow tube for producing a second partial magnetic field of predeterminable average strength which also cuts through the fluid;

varying the strength of at least one of the excitation currents in such a manner that the average strengths of the two partial magnetic fields are at least temporarily different from each other;

reversing the polarity of one of the two excitation currents in such a manner that the two partial magnetic fields are at least temporarily directed opposite to each other while having different average strengths;

inducing a voltage in the moving fluid traversed by the two partial magnetic fields for changing potentials applied to measuring electrodes positioned at the flow tube; and picking off potentials applied to the measuring electrodes for producing a measurement signal derived from the voltage induced in the moving fluid.

2. A method as set forth in claim 1, further comprising the step of:

varying the strength of at least one of the two excitation currents in such a way that the average strengths of the two partial magnetic fields are temporarily essentially equal.

3. A method as set forth in claim 2, further comprising the step of:

repeatedly sampling the measurement signal to obtain a sequence of discrete sample values which corresponds to a waveform of said induced voltage.

4. A method as set forth in claim 3, further comprising the step of:

storing the sampling sequence section by section in a storage means of the measuring and control circuit.

5. A method as set forth in claim 4, further comprising the step of:

determining a first voltage difference between said discrete sample values of said sequence of discrete sample values which were each sampled at an instant when said average strengths of the two partial magnetic fields are equal.

6. A method as set forth in claim 3, further comprising the step of:

determining a first voltage difference between said discrete sample values of said sequence of discrete sample values which were each sampled at an instant when said average strengths of the two partial magnetic fields are equal.

7. A method as set forth in claim 1, further comprising the step of: repeatedly sampling the measurement signal to obtain a sequence of discrete sample values which corresponds to a waveform of said induced voltage.

8. A method as set forth in claim 7, further comprising the step of:

storing the sampling sequence section by section in a storage means of said measuring and control circuit.

9. A method as set forth in claim 8, further comprising the step of:

determining a first voltage difference between said discrete sample values of said sequence of discrete sample values which were each sampled at an instant when said average strengths of the two partial magnetic fields are equal.

10. A method as set forth in claim 9, further comprising the step of:

determining a second voltage difference between said discrete sample values of said sequence of discrete sample values which were each sampled at a instant when said average strengths of the two partial magnetic fields are different from each other and the two partial magnetic fields are directed opposite to each other.

11. A method as set forth in claim 7, further comprising the step of: determining a first voltage difference between said discrete sample values of said sequence of discrete sample values which were each sampled at an instant when said average strengths of the two partial magnetic fields are equal.

12. A method as set forth in claim 11, further comprising the step of:

determining a second voltage difference between said discrete sample values of said sequence of discrete: sample values which were each sampled at a instant when said average strengths of the two partial magnetic fields are different from each other and the two partial magnetic fields are directed opposite to each other.

13. A method as set forth in claim 12, further comprising the step of:

determining a volumetric flow rate value by means of said two voltage differences.

14. A method as set forth in claim 13, further comprising the steps of:

deriving the volumetric flow rate value from said first voltage difference; and using said second voltage difference to correct flow-profile-induced deviations of said first voltage difference from the actual volumetric flow rate.

15. A method as set forth in claim 12, further comprising the step of:

using said second voltage difference to trigger an alarm which signals a flow profile resulting in erroneous measurement signals.

16. A method as set forth in claim 12, further comprising the step of:

forming a quotient of said two voltage differences.

17. A method as set forth in claim 16, further comprising the step of:

comparing said quotient with a threshold value which represents a predetermined flow profile to be monitored.

18. An electromagnetic flowmeter for a fluid flowing in a line, comprising:

a flow tube connectable into the line conducting the fluid;

a measuring and control circuit;

a coil assembly fed by said measuring and control circuit, said coil assembly producing a magnetic field cutting across said flow tube by means of a first field coil mounted on said flow tube and by means of a second field coil mounted on said flow tube;

at least two measuring electrodes for picking off potentials which are induced in the fluid flowing through said flow tube and traversed by the magnetic field; and means connected at least intermittently to said measuring electrodes for producing at least one measurement signal derived from the potentials induced in the fluid, wherein:

said first field coil is traversed at least intermittently by a first excitation current, and said second field coil is traversed at least intermittently by a second excitation current; and the two excitation currents are adjusted by means of said measuring and control circuit in such a manner that at least intermittently, a first partial magnetic field, produced by means of said first field coil, has an average strength which is different from an average strength of a second partial magnetic field, produced simultaneously by means of said second field coil.

19. A method of operating an electromagnetic flowmeter for measuring the volumetric flow rate of an electrically conductive and moving fluid, the flowmeter having a flow sensor comprising: a flow tube for the moving fluid, of which an inner portion, which contacts the fluid, is electrically nonconductive, and which has a tube wall; a first electrode positioned with respect to the flow tube, a second electrode positioned with respect to the flow tube, which electrodes are located on a first diameter of the flow tube; and a coil assembly, mounted on the flow tube and comprising a first field coil and a second field coil, the coil assembly being located on a second diameter of the flow tube, which is perpendicular to the first diameter, and being operable to produce a magnetic field cutting across the tube wall and the fluid when a first excitation current flows in the first field coil and a second excitation current flows in the second field coil, the method comprising the step of:

changing the amplitude and direction of the excitation currents periodically during each cycle of the excitation currents such that: during a first quarter cycle, the excitation currents are equal, have a constant value, and flow through the field coils in the same direction, a first direction; during a second quarter cycle, the first excitation current has the constant value and flows through the first field coil in an opposite direction to the first direction, the second excitation current is less than the constant value by a constant amount and flows through the second coil in the first direction; during a third quarter cycle, the excitation currents have the constant value and flow through the field coils in the opposite direction; and during a fourth quarter cycle, the first excitation current has the constant value and flows through the first field coil in the first direction, and the second excitation current is less than the constant value by the constant amount and flows through the second field coil in the opposite direction;

forming first, second, third and fourth voltages from the two potentials during the first, second, and fourth quarter cycles, respectively;

forming a first voltage difference from the first and third voltages, which serves to compute a volumetric flow rate signal, forming a second voltage difference from the second and fourth voltages, forming a quotient from the second and first voltage differences, said quotient is determined during a calibration step of the electromagnetic flowmeter under uniformly turbulent flow conditions and stored as a device constant in the flowmeter;

continuously forming instantaneous values of the quotient in operation, which are compared with the device constant; and triggering an alarm when a predeterminable threshold is exceeded and/or the volumetric flow rate signal is corrected.

* * * * *